United States Patent [19]

Wasserstrom

[11] Patent Number: 4,947,150

[45] Date of Patent: Aug. 7, 1990

[54] PRESSURE SENDER

[75] Inventor: Henry Wasserstrom, Chicago, Ill.

[73] Assignee: Stewart Warner Corporation, Chicago, Ill.

[21] Appl. No.: 311,651

[22] Filed: Feb. 15, 1989

[51] Int. Cl.⁵ .............................................. H01L 10/10
[52] U.S. Cl. ........................................ 338/42; 338/36; 73/708; 73/715
[58] Field of Search ....................... 338/36, 42; 73/708, 73/715, 725

[56] References Cited

U.S. PATENT DOCUMENTS

| 4,079,351 | 3/1978 | Levine ..................................... 338/36 |
| 4,433,321 | 2/1984 | Widdowson ........................... 338/42 |
| 4,449,112 | 5/1984 | Gould ................................. 338/42 X |
| 4,449,113 | 5/1984 | Gould et al. ........................ 338/42 X |

Primary Examiner—Bruce A. Reynolds
Assistant Examiner—Marvin M. Lateef
Attorney, Agent, or Firm—Lorusso & Loud

[57] ABSTRACT

A pressure sender is provided with a variable electrical resistance corresponding to a sensed pressure, to be placed in series with a voltage source and a pressure gauge. The pressure sender is diaphragm-actuated, which diaphragm controls the positioning of an electrical contact against a ceramic thick film rheostat. An electrically conductive metal clip secures the rheostat in position as well as completes the electrical connection between the rheostat and the electrical circuit of which the pressure sender is a part. The electrical contact is rockingly mounted so that deflection of the diaphragm displaces the electrical contact through an arcuate travel path along various resistance positions of the thick film ceramic rheostat. Current from the electrical circuit will flow through the metal clip to input contacts of the rheostat, and then to the resistance positions. The lower the pressure being sensed, the farther away from the input contacts will the electrical contact contact the resistance positions so that lower pressure will result in higher resistance of the pressure sender. By monitoring this resistance, the pressure being sensed can be determined.

8 Claims, 3 Drawing Sheets

PRESSURE SENDER

BACKGROUND OF THE INVENTION

This invention relates to pressure senders which are designed to be tapped into a fluid line, to monitor the pressure in that line, and specifically to pressure senders that deliver an analog signal to a pressure gauge so that the pressure of the fluid line can be continuously monitored.

There are many applications in which system fluid pressure needs to be monitored. Liquid pressure is monitored, for example, for oil pressure in internal combustion engines, as well as in other automobile systems such as brake fluid systems. Air pressure needs to be monitored in air actuated brake systems and in any number of power tools which are driven by compressed air.

For safety reasons as well as to aid preventative maintenance, it is desirable in situations such as these to continuously monitor pressure rather than simply indicate when a low pressure condition has occurred. It is applications such as these in which pressure senders, rather than pressure switches, are used.

Typically, pressure senders are tapped into a pressure line so that a chamber of the pressure sender experiences the same pressure as that experienced by the pressure line. Pressure senders, also called transducers, receive a signal in one form and translate that signal to a corresponding signal in another form. With diaphragm actuated pressure senders, pressure changes in the pressure line cause a diaphragm in the sender to deflect, resulting in a mechanical signal. To turn this mechanical signal into an electrical signal, the diaphragm in turn displaces a follower which displaces an electrical contact of the pressure sender which is in contact with a variable resistor. As a result, the resistance of the pressure sender in the electrical circuit changes and that change is monitored by the pressure gauge which translates the change into a specific pressure value.

These known pressure senders are typically provided with wound copper wire rheostats. The rheostats are electrically wired to a terminal post at one end and to electrically insulative material at their other end. Typically the terminal post is where the current from the system flows to the pressure sender. When current passes from the terminal post to the rheostat, it will flow to the movable electrical contact. Such a pressure sender is described in U.S. Pat. No. 4,079,351 to Levine.

A problem with this type of pressure sender is that it is difficult to control the resistance of the rheostat at precise points along the coil. The result is that these known pressure senders are difficult to calibrate so that a desired resistance corresponds to a desired pressure. Also, it is difficult to manufacture the rheostats in mass with any uniformity so that all of the rheostats made have equivalent resistances at equivalent points. Due to this problem, it is difficult to construct pressure senders that use these rheostats with any uniformity. Each pressure sender has individual properties so that a pressure monitoring system using known pressure senders of this type has to be calibrated based on the properties of its individual pressure sender.

Another problem with known pressure senders using copper wire wound rheostats is that of mechanical breakdown through cycling. Due to a large friction surface of the moving electrical contact as it travels along the wire of the rheostat, both the electrical contact and the rheostat can deteriorate after extensive cycling. This deterioration can result in the pressure sender requiring re-calibration or in the complete failure of the device all together.

Known pressure senders have also experienced improper readings due to a poor electrical connection between the rheostat and the terminal post where current from the system flows to the pressure sender. The single wire connection which typically connects the rheostat to the terminal post can easily become dislodged due to a defect in manufacturing or to the pressure sender being subjected to mechanical shock.

As pressure senders of this type are often used in harsh environments leading to mechanical shock, it is important that the electrical circuit be securely established. In the past, pressure senders using copper wire wound rheostats have experienced problems in such environments due to the difficulty of adequately securing the rheostat connection to the rest of the electrical circuit. Also, as these copper wire wound rheostats are relatively heavy in comparison to the rest of the pressure sender, the force generated by the acceleration of the pressure sender during mechanical shock and acting on the mass of the rheostat can be great. This force often results in damage to the electrical circuit of the pressure sender.

It is, therefore, an object of the present invention to provide a pressure sender which can be manufactured more efficiently and uniformly than known pressure senders.

It is also an object of the present invention to offer a pressure sender which is more reliable in harsh environments than known pressure senders.

It is another object of the present invention to offer a pressure sender that is more durable and will have a longer service life than known pressure senders.

It is yet another object of the present invention to provide a pressure sender which offers more consistent and accurate signals than known pressure senders.

SUMMARY OF THE INVENTION

The problems generally associated with known pressure senders are substantially overcome by the device of the present invention which is a diaphragm actuated pressure sender provided with a thick film rheostat on a ceramic platform. In accordance with the present invention, the thick film rheostat is both mechanically secured and electrically connected to a current terminal by a single piece electrically conductive clip.

The pressure sender of the present invention mechanically responds to pressure by way of a high temperature plastic diaphragm which is placed in fluid communication with the fluid line to be monitored. The diaphragm is supported by a metal disk shaped spring which is manufactured to deflect specific distances in response to specific pressures. Below a specified pressure, the diaphragm and disk spring of the present invention will be flat. An increase in pressure in the fluid line above that specified pressure will result in a concave deflection of the diaphragm and disk spring with respect to the fluid line which displaces an electrical follower in contact with a thick film rheostat.

The pressure sender of the present invention acts as a transducer in that it transforms the mechanical deflection of the diaphragm into an electrical signal. In accordance with the present invention, a pressure gauge is placed in serial electric communication with the pressure sender, and current is allowed to flow through the gauge and the pressure sender. The pressure sender is provided with a terminal post for current input which is connected to the thick film ceramic rheostat by way of a metal clip. The metal clip also holds the rheostat in position. As the deflection of the diaphragm as described above controls the positioning of the electrical contact/follower, it thereby controls the resistance setting of the rheostat. By monitoring the current passing through the electrical circuit, the pressure gauge can determine the resistance of the pressure sender and therefore the pressure in the fluid line.

The invention can be best understood by making reference to the following discussion and Drawing in which like reference numerals refers to like members.

DESCRIPTION OF THE PREFERRED EMBODIMENT

Figure 1:
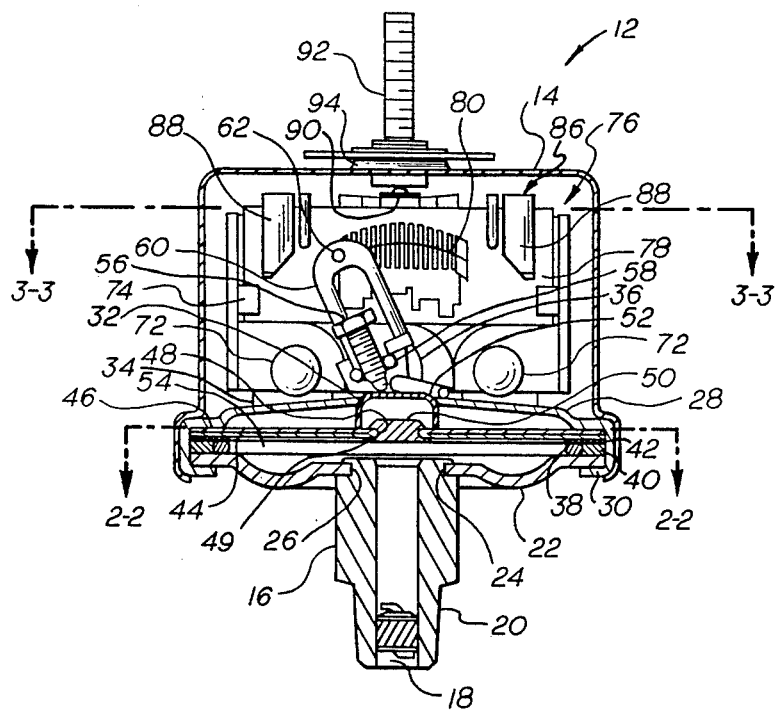
FIG. 1 is an enlarged front section view of a pressure sender constructed in accordance with the present invention.

At the outset the invention is described in its broadest overall aspects with a more detailed description following. In its broadest aspects as depicted in FIG. 1, the present invention is a diaphragm actuated pressure sender with a thick film rheostat on a ceramic base.

In accordance with the present invention there is provided a housing 14 which is disposed over a main assembly of the pressure sender 12. As shown in FIG. 1, the sender has a connection means 16 which is designed to be tapped into a fluid line (not shown) of which the pressure is to be monitored. For this purpose, the connection means 16 will typically be provided with an end portion 20 so that it may be inserted into a suitable port in the fluid line. The end portion 20 may be threaded for ease of insertion. The end portion 20 defines an opening 18 so that matter in the fluid line can pass into the connection means 16.

The connection means 16 is designed to pass through a base plate 22 of the pressure sender 12 to place a pressure chamber 54 in communication with the fluid line. The geometry and function of the pressure chamber 54 are described further hereinbelow. So that the connection means 16 may pass through the base plate 22, the base plate 22 is annularly shaped to define an opening 24 in its center portion. The top portion of the connection means 16 is correspondingly sized and shaped with a groove 26 so that it can pass through the base plate opening 24 and lock into place. The portion of base plate 22 which abuts the connection means 16 locks into the groove 26 to secure the base plate 22 and the connection means 16 together. This connection is tightly enough fit so as to prevent any matter which passes from the fluid line, through the connection means 16, and into the pressure chamber 54, from escaping from the pressure chamber 54. There is positioned above the base plate 22 a correspondingly shaped diaphragm stop 28, the outer diameter of which is formed to resemble a U-shaped cross section 30. Typically, this forming can be accomplished through the use of a "Bezel-Type" piece of vertical metal forming equipment. To insure an efficient seal, it is important that the U-shaped cross section 30 be formed uniformly and simultaneously. After this U-shaped cross section 30 is formed, it is crimped to secure the entire diaphragm assembly in place. The diaphragm stop 28, like the base plate 22, is annularly shaped to define a center opening 32 the function of which is described below.

The components of the present invention which translate the pressure of the fluid line into a mechanical signal are "sandwiched" between the base plate 22 and the diaphragm stop plate 28. First, a ring shaped spacer 40 is positioned against the base plate 22. The spacer 40 has an outer circumference equivalent to the circumference of the base plate 22 and an inner circumference which is slightly less. Interfitting the spacer 40 is an O-ring style gasket 38 which also is positioned against the base plate 22. The gasket 38 has an outer diameter which is only slightly smaller than the inner diameter of the spacer 40 to help keep the two contiguous. As a result the spacer 40 acts to keep the gasket 38 in its proper position.

Resting upon the spacer 40 and the gasket 38 there is a high temperature diaphragm 44. The diaphragm 44 will typically be constructed of a plastic material which is capable of withstanding relatively high temperatures such as those which the pressure sender 12 of the present invention will typically be required to endure. Testing and experience has shown that Kapton, a trademark of the E. I. DuPont de Nemours Corporation for polyamide plastic, is a suitable material.

In conjunction with the gasket 38, the base plate 22 and the upper portion of the connection means 16, the diaphragm 44 defines the pressure chamber 54. The pressure chamber 54 is placed in fluid communication with the fluid line by the connection means 16. As a result, the pressure chamber 54 will always experience the same pressure as that which is experienced by the fluid line. Accordingly, depending on that pressure, the diaphragm 44 will be forced to deflect concavely with respect to the pressure chamber during periods of increased pressure in the fluid line.

On the side of the diaphragm 44 opposite to that against which the gasket 38 and spacer 40 rest, there are provided a diaphragm support 42 and a diaphragm follower 50. The diaphragm support 42, like the spacer 40, is ring shaped with an outer diameter equal to the diameter of the diaphragm 40. The diaphragm follower 50 is disk shaped with a diameter which is relatively small in comparison to the diameter of the diaphragm 44. Accordingly, the diaphragm support 42 is positioned against the diaphragm 40 so that its outer circumference traces the circumference of the diaphragm 40 while the diaphragm follower 50 is positioned co-centrally against the diaphragm 44.

Figure 2:
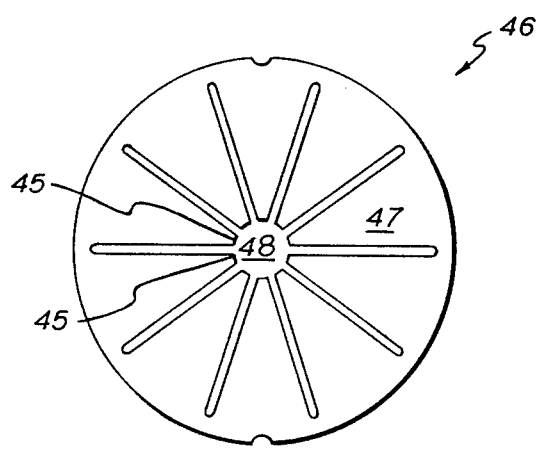
FIG. 2 is a section view of the pressure sender of the present invention taken along line 2—2 of FIG. 1.

Above the diaphragm 44 on the opposite side of the diaphragm support 42 is a cantilever spring 46, as shown in FIG. 2, which is precisely engineered to control the deflection of the diaphragm 44. The diaphragm 44 and the cantilever spring 46 are in mechanical communication with one another so that a deflection of the diaphragm 44 results in an equivalent deflection of the cantilever spring 46. The cantilever spring 46 is constructed of a material which is more rigid than the diaphragm 44 so that it is the cantilever spring 44 which controls the deflection of the two members in response to pressure in the fluid line. This controlling feature of the cantilever spring 46 is discussed in more detail below. The cantilever spring will typically be constructed out of metal, such as, for example, stainless steel.

The cantilever spring 46 is disk shaped with a diameter equivalent to that of the diaphragm 44. As shown in FIG. 2, the cantilever spring 46 is formed of a series of cantilever arms 47 which are able to move independently of one another. As they project toward the center of the cantilever spring 46, these arms 47 stop short of the geometrical center of the cantilever spring 46 to define an opening 48.

The diaphragm follower 50 is provided with a circumferential groove 49 into which the inner ends 45 of the cantilever arms 47 of the cantilever spring 46 project. In this manner, because the diaphragm follower 50 is always in contact with the diaphragm 44, the cantilever spring 46 will control both the displacement of the diaphragm follower 50 and the deflection of the diaphragm 44. This is because, while flexible, the cantilever spring 46 is much more stiff than the diaphragm 44. Accordingly, as pressure in the pressure chamber 54 causes the diaphragm 44 to deflect, the cantilever spring 46, through the diaphragm follower 50, controls this deflection.

In the absence of the cantilever spring 46, the diaphragm 44 would deflect somewhat erratically in response to the pressure in the pressure chamber 54. The cantilever spring 46, however, is engineered so that the deflection of the diaphragm 44 is consistently proportional to the pressure of the pressure chamber 54. That is, a specific pressure in the pressure chamber 54 will always result in a specific deflection of the diaphragm 44.

Figure 3:
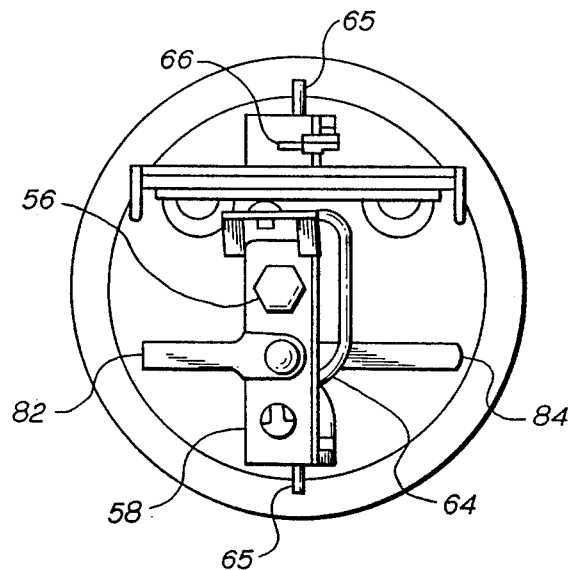
FIG. 3 is a top section view of the pressure sender of the present invention taken along line 3—3 of FIG. 1.

In accordance with the present invention, resting on the cantilever spring 46 and projecting through the diaphragm stop 28, there is provided a button 52. This button 52 communicates the deflection of the diaphragm 44 to the rest of the pressure sender assembly or, in particular, to a calibration screw 56. As shown in FIG. 3, the calibration screw 56 threadedly projects through a rocker 58. The calibration screw 56 is also in contact with the top surface of the button 52. After calibration, which is described below, the point at which the calibration screw 56 passes through the rocker 58 is treated with an adhesive, such as glyptal, to permanently attach the calibration screw 56 to the rocker 58. As a result, when deflection of the diaphragm 44 displaces the button 52, so too will the calibration screw 56 and the rocker 58 be displaced.

The rocker 58 is pivotably mounted above the button 52 by way of a rocker shaft 64 and rocker support tabs 36 to be substantially parallel to the diaphragm stop plate 28. The rocker support tabs 36 are stamped out of the diaphragm stop plate 28 and bent 90 degrees so that they stand up perpendicularly to the diaphragm stop plate 28. The rocker shaft 64 passes through holes in the rocker support tabs 36 to provide short legs 65 on the outside of each rocker support tab 36. The rocker 58 is then mounted over these legs 65. As a result of this mounting configuration, when the diaphragm 44 deflects to displace the button 52, the calibration screw 56, restricted by the rocker 58, is displaced to slide over the top of the button 52. Accordingly, an arcuate line of travel of the rocker 58 is generated, the center of which is intersected by the line of travel of the button 52. The rocker shaft 64 is formed so as to not interfere with the displacement of the button 52.

Inside of one of the rocker support tabs 36 the rocker shaft 64 passes through a helical spring (not shown) which has two leg portions. The helical spring is positioned so that its leg portions are constantly pinched by the rocker 58 and the diaphragm stop plate 28. As a result, the helical spring exerts a constant force on the rocker 58 so that the calibration screw 56 is in contact with the button 52.

Mounted on the side of the rocker 58 opposite to that which faces the diaphragm stop plate 28 is an electrical follower 60. This follower 60 projects from the rocker 58 at a slightly acute angle. On the end of the electrical follower 60 is an electrical contact 62 which contacts a thick film ceramic rheostat 76. The rocker 58 is also electrically connected to the diaphragm stop plate 28 by means of a ground strap 82 which has low electrical resistance.

Figure 4:
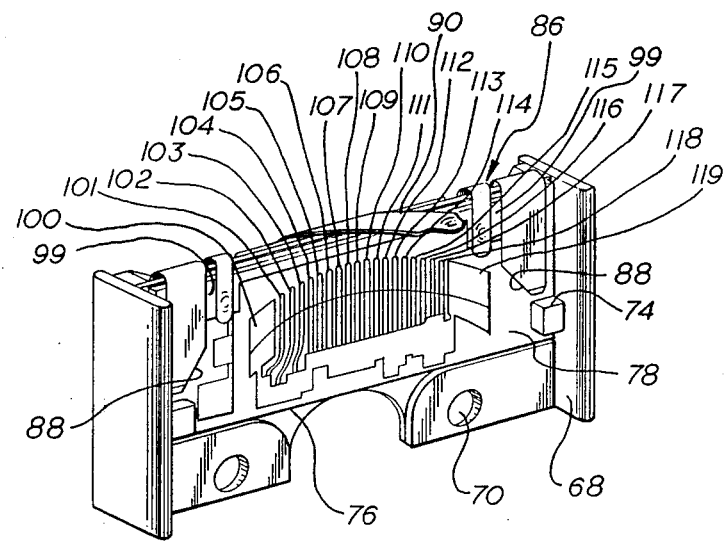
FIG. 4 is a perspective view of the holder, resistor, and clip assembly of the present invention.

The rheostat 76 is provided with an electrically conductive portion 80 which, as depicted in detail in FIG. 4, is made up of input contacts 99 and individual resistance positions 100 through 119. These electrically conductive portions will typically be formed of an electrically conductive ink which is silk screened onto a ceramic plate in varying thicknesses to result in varying resistances. The ink is then laser scribed to offer well defined resistance at varying points along the resistor. The ceramic body portion 78 will typically be of an alumina-silicate composition.

The ceramic thick film rheostat 76 is an improvement over the copper wire wound rheostats of known pressure senders due to its compact, lightweight construction, and relatively smooth contact surface. As the electrical contact 62 travels over the smooth electrically conductive resistance positions 100 through 119 of the present invention, there is little friction generated and, as a result, little mechanical degradation of the electrically conductive ink or the electrical contact 62. This ensures continued sound electrical contact between the electrical contact 62 and the resistance positions 100 through 119 with clear definition between individual resistance positions; a marked improvement over known pressure senders using copper wire wound rheostats where friction generated as the electrical contact scrapes over the ridged surface of the rheostat leads to fraying of the rheostat creating a poor, inexact electrical connection.

As the rocker 58 is displaced through its arcuate travel path by the calibration screw 56 being driven by the button 52, the electrical contact 62 will travel along a corresponding path to intersect varying points of the electrically conductive portion 80 of the rheostat 76. In this manner, the resulting resistance of the rheostat 76 is varied in proportion to the deflection of the diaphragm 44. The pressure sender 12 is thereby able to transduce the mechanical signal generated by the diaphragm 44, in the form of a deflection in response to the pressure in the fluid line, to an electrical signal.

Figure 5:
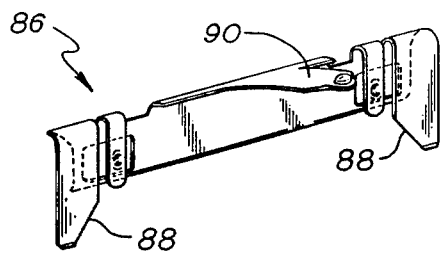
FIG. 5 is a perspective view of an electrically conductive clip constructed in accordance with the present invention.

The thick film ceramic rheostat 76 of the present invention is mounted on a non-conductive holder 68. The non-conductive holder 68 is secured perpendicularly to the diaphragm stop plate 28 by way of holder support tabs 34 which are stamped from the diaphragm stop plate 28 and bent to a 90 degree angle. Rivets 72 then pass through rivet holes 70 in the holder 68 as well as through holes 35 in the holder support tabs 34. The holder 68 is provided with resistor clips 74 which define a groove within which the thick film ceramic rheostat 76 is positioned. To complete both the mechanical and the electrical connection, in accordance with the present invention an electrically conductive clip 86 (FIG. 5) is placed over the rheostat 76 and the non-conductive holder 68.

The clip 86, by simultaneously serving two functions, is an important feature of the device of the present invention. First, the clip 86 acts as a mechanical anchor to prevent the rheostat 76 from becoming dislodged from the holder 68. Thus, the problems of adequately securing the electrical circuit, associated with known devices, are eliminated. To adequately secure the rheostat 76, the clip 86 has two main components: a projecting arm 90; and two electrically conductive rheostat clamp members 88. The rheostat clamp members 88 clamp over the rheostat 76 and the non-conductive holder 68 so that they contact the input contacts 99 of the rheostat 76. In addition to its self-generated clamping force, the clip 86 is held further in place by a terminal post contact 96 on the housing 14 which prevents the projecting arm 90 of the clip 86 from moving upward. As a result, once the housing 14 is secured in place, the clip 86, and hence the rheostat 76 will also be secured in place.

The other main function of the clip 86 is to complete the electrical circuit between the rheostat 76 and the terminal post contact 96. Since the input contacts 99 are in electrical communication with the individual resistance positions 100 through 119, the clip 86 places the terminal post contact 96 in electrical communication with these resistance positions of the rheostat 76.

The clip 86 of the present invention is an improvement over known pressure senders because it provides a more stable electrical contact between the terminal post 92 and the rheostat 76. Known pressure senders using wire wound rheostats typically are connected to the electrical circuit in which they function by only one strand of wire, which during construction or normal operation of the device can easily become detached. The electrically conductive clip 86 of the present invention, on the other hand, offers a secure electrical connection of the rheostat 76 to the terminal post 92, as well as a firm mechanical support of the rheostat 76 in the non-conductive holder 68. When the housing 14 is put into position, the terminal post contact 96 will exert a force on the projecting arm 90 of the clip 86 thereby securing the electrical connection between the terminal post 92 and the rheostat 76 as well as ensuring that the clip 86 stays in position to anchor the rheostat 76 to the electrically non-conductive holder 68.

The terminal post contact 96 is insulated from the housing 14 by insulative material 94 so that once current reaches the terminal post contact 96 it only has one path of travel available. That path is to the clip 86 and onto the rheostat 76. Once the current reaches the resistance positions of the rheostat 76 it will travel until it reaches the electrical contact 62 from which it will eventually travel to ground.

The terminal post contact 96 is electrically connected to a terminal post 92 which projects outward from the housing 14 to provide an electrical terminal for the pressure sender 12 as a whole. It is into the terminal post 92 that current of the electrical circuit for monitoring pressure flows. By measuring the current in this circuit, a pressure gauge (not shown) will calculate the resistance of the rheostat 76 of the pressure sender 12 to determine the deflection of the diaphragm 44 and correspondingly the pressure in the fluid line.

In operation in accordance with the present invention, the pressure sender 12 will be placed in a serial electrical circuit with a pressure gauge. Current is directed to flow through the pressure gauge to the terminal post 92 of the pressure sender 12. From the terminal post 92, the current will flow to the terminal post contact 92 and on to the projecting arm 90 of the clip 86. Being an electrically conductive entity, the clip 86 will then transmit the current to the input contacts 99 of thick film ceramic resistor 76 with which it is also in contact. From this point, the current path travels along the electrically conductive portion 80 of the resistor 76 until it meets the electrical contact 62 of the electrical follower 60. The current will not flow onto the ceramic base 78 of the rheostat 76 because the base 78 is electrically non-conductive. As discussed above, the positioning of this electrical contact 62, and thereby the value of the rheostat 76, is determined by the deflection of the diaphragm 44 which is dependent upon the pressure of the fluid line. Upon reaching the electrical contact 62, the current will flow onto the electrical follower 60 from which it will pass to the rocker 58. Then, following the path of least resistance, the current will flow through the ground strap 82 to the diaphragm stop plate 28. And finally, the current will pass on to the base plate 22, to the connection means 16 which is wired to ground.

By monitoring the current flow through this circuit, it is possible to determine the resistance value of the rheostat 76 and thereby the pressure of the fluid line.

By way of illustration but not of limitation, the following example depicts a pressure sender in accordance with the present invention designed to effectively monitor pressure in a fluid line ranging from zero to 80 PSI. With reference to FIG. 4, the pressure sender is designed so that when the pressure in the fluid line is at zero, the electrical contact 62 will contact resistor position 100. Current passing onto the resistor 76 will flow from position 119 to position 100 so it can be seen that a zero pressure condition in the fluid line is translated as a maximum resistance condition. As the pressure in the fluid line increases and the electrical contact moves closer toward resistor position 119, the resulting resistance value of the rheostat 76 will decrease. In accordance with this example, the electrical contact 62 will be adjusted at installation by turning the calibration screw 56 so that the electrical contact 62 just contacts resistor position 100, or 240 ohms, at zero pressure and descends to position 116, or 33.5 ohms, at 80 PSI. After this calibration is completed, the positioning of the calibration screw 56 is secured in the rocker 58 through the application of an adhesive such as glyptal. Then, pressures between zero and 80 PSI can be interpolated from the following resistance values as the electrical contact 62 moves from resistor position 100 to resistor position 119.

| RESISTOR POSITION | RESISTANCE OHMS | LOADED AMPS |
| --- | --- | --- |
| 100 | 240 | .04 |
| 101 | 232 | .04 |
| 102 | 196 | .04 |
| 103 | 165 | .05 |
| 104 | 153 | .05 |
| 105 | 144 | .05 |
| 106 | 128 | .06 |
| 107 | 112 | .06 |
| 108 | 103 | .06 |
| 109 | 94 | .07 |

-continued

| RESISTOR POSITION | RESISTANCE OHMS | LOADED AMPS |
| --- | --- | --- |
| 110 | 85 | .07 |
| 111 | 73 | .07 |
| 112 | 67 | .07 |
| 113 | 59.5 | .09 |
| 114 | 50 | .10 |
| 115 | 42 | .10 |
| 116 | 33.5 | .11 |
| 117 | 28 | .12 |
| 118 | 23 | .12 |
| 119 | 9 | .15 |

The embodiment described above is but one of several which utilize this invention and is set out here by way of illustration but not of limitation. Many other embodiments which will be readily apparent to those skilled in the art may be made without materially departing from the spirit and scope of this invention. The invention, therefore, is to be defined by the claims that follow.

What is claimed is:

1. A pressure sender, for use in a pressure monitoring electrical circuit, to be placed in communication with a fluid line under pressure to sense the pressure in the fluid line, said pressure sender comprising:
   a means for tapping into the fluid line to place said pressure sender in fluid communication with the fluid line;
   a diaphragm in air tight communication with the means for tapping into the fluid line, said diaphragm being constructed to deflect in response to pressure changes in the fluid line;
   a means for restricting the deflection of said diaphragm so that equivalent pressures in the fluid line always result in equivalent deflections of the diaphragm;
   an electrical contact positioned a distance from a side of said diaphragm opposite to that which faces said tapping means;
   a means for placing said electrical contact in mechanical communication with said diaphragm for displacing said electrical contact a distance proportional to the deflection of said diaphragm;
   a thick film variable resistor, having electrically conductive and electrically non-conductive portions, fixedly mounted to be in electrical communication with said electrical contact so that as said electrical contact is displaced by said diaphragm said electrical contact follows a path along said electrically conductive portion of said thick film variable resistor in proportion to the deflection of said diaphragm, to engender a corresponding electrical resistance;
   a means for providing electrical contact between said thick film variable resistor and an outer terminal by which the pressure sender is connected to the pressure monitoring electrical circuit and for mechanically securing said thick film variable resistor in place; and
   an electrically non-conductive holder mounted substantially perpendicular to said diaphragm, said holder being provided with tabs which define a channel within which said thick film variable resistor is positioned so that said electrically conductive portion of said variable resistor is in electrical communication with said electrical contact.

2. The pressure sender as set forth in claim 1, wherein said electrically conductive portion of said thick film variable resistor is silk screened onto said electrically non-conductive portion of said thick film variable resistor and laser scribed to define input contacts and individual resistance positions.

3. The pressure sender as set forth in claim 1 wherein said means for providing electrical contact between said thick film variable resistor and said outer terminal and for mechanically securing said thick film variable resistor, is an electrically conductive metal clip which clamps said thick film variable resistor to said holder while contacting said electrically conductive portion of said variable resistor.

4. The pressure sender as set forth in claim 3, wherein said electrically conductive metal clip includes a clamping portion for securing said variable resistor to said holder and a projecting arm for completing and electrical connection between said variable resistor and said outer terminal.

5. The pressure sender as set forth in claim 1, wherein said means for restricting the deflection of said diaphragm is a cantilever spring.

6. The pressure sender as set forth in claim 5, wherein said means for placing said electrical connection in mechanical communication with said diaphragm comprises:
   a button in contact with said cantilever spring so that any deflection of the cantilever spring equivalently displaces said button;
   a calibration screw in contact with said button;
   a rocker through which said calibration screw is screwed, said rocker being rockingly connected above said button so that when said cantilever spring displaces said button, said calibration screw is also displaced which results in said rocker being displaced through an arcuate travel path;
   an electrical follower mounted at a proximal end on said rocker, at a slightly acute angle, said electrical contact being mounted on a distal end of said electrical follower to be in contact with said electrically conductive portion of said thick film variable resistor so that when said rocker is displaced through its arcuate path said electrical contact experiences an equivalent angular displacement but a greater lineal displacement along said electrically conductive portion of said variable resistor.

7. The pressure sender as set forth in claim 1 wherein said electrically conductive portion of said thick film variable resistor defines individual resistance positions and input contacts, said individual resistance positions being serially connected to said input contacts so that when said electrical contact contacts a resistance position which is electrically farther away from said input contacts with relation to other resistance positions, the resistance engendered by said variable resistor will be greater than the resistance engendered when said electrical contact contacts said other resistance positions.

8. The pressure sender as set forth in claim 1 wherein said non-conductive portion of said thick film variable resistor is alumina-silicate.

* * * * *